(12) United States Patent
Hanskamp

(10) Patent No.: US 10,874,085 B2
(45) Date of Patent: Dec. 29, 2020

(54) TOILET FOR CATTLE, IN PARTICULAR FOR COW

(71) Applicant: HANSKAMP AGROTECH B.V., Doetinchem (NL)

(72) Inventor: Hendrik Jan Hanskamp, Doetinchem (NL)

(73) Assignee: HANSKAMP AGROTECH B.V., Doetinchem (NL)

( * ) Notice: Subject to any disclaimer, the term of this patent is extended or adjusted under 35 U.S.C. 154(b) by 0 days.

(21) Appl. No.: 16/632,282

(22) PCT Filed: Jul. 12, 2018

(86) PCT No.: PCT/NL2018/050482
§ 371 (c)(1),
(2) Date: Jan. 17, 2020

(87) PCT Pub. No.: WO2019/022594
PCT Pub. Date: Jan. 31, 2019

(65) Prior Publication Data
US 2020/0359592 A1  Nov. 19, 2020

(30) Foreign Application Priority Data
Jul. 24, 2017  (NL) ...................................... 2019330

(51) Int. Cl.
*A01K 1/01*  (2006.01)
*A01K 1/00*  (2006.01)
(Continued)

(52) U.S. Cl.
CPC .......... *A01K 1/0103* (2013.01); *A01K 1/0142* (2013.01); *A01K 1/0011* (2013.01); *A01K 1/10* (2013.01); *A01K 1/12* (2013.01)

(58) Field of Classification Search
CPC .. A01K 15/028; A01K 1/0103; A01K 1/0142; A01K 1/12; A01J 5/017; A01J 5/0175
See application file for complete search history.

(56) References Cited

U.S. PATENT DOCUMENTS 2,853,052 A    9/1958  Pearson
3,038,444 A    6/1962  Roth
(Continued)

FOREIGN PATENT DOCUMENTS

CA    880679 A       9/1971
CA    2388923 A1 *   5/2001  ........... A01K 15/028
(Continued)

OTHER PUBLICATIONS

Arjan Hijlkema, "urineer film", Oct. 16, 2015 (Oct. 16, 2015), YoutubeRetrieved from the Internet:URL:https://www.youtube.com/watch?v=D3T3Xq3HL1o&feature=youtu.beXP002780025[retrieved on Apr. 11, 2018].
(Continued)

*Primary Examiner* — Magdalena Topolski
*Assistant Examiner* — Shada Mohamed Alghailani
(74) *Attorney, Agent, or Firm* — AEON Law, PLLC; Adam L. K. Philipp; David V. H. Cohen

(57) ABSTRACT

A urine collection device for a cow, comprising a positioner, a urine container coupled to positioner, a sensor for detecting a cow position, a stimulator for stimulating a stimulation region of a cow, wherein stimulation region is ventral with respect to a vulva of a cow, and a controller, wherein the controller is functionally coupled to the sensor for receiving a position of the cow. The controller is configured for controlling the position the stimulator at the stimulation region for stimulating the cow when a cow is positioned within a predefined range. When stimulation starts an urination, the positioner positions the urine container from a
(Continued)

storage position to a working position for receiving a subsequent flow of urine from the stimulated cow.

20 Claims, 8 Drawing Sheets

(51) Int. Cl.
*A01K 1/12* (2006.01)
*A01K 1/10* (2006.01)

(56) References Cited

U.S. PATENT DOCUMENTS

| | | | |
|---|---|---|---|
| 3,827,403 A | | 8/1974 | Meyer |
| 4,294,196 A | * | 10/1981 | Larsen ..................... A01K 1/12 |
| | | | 119/524 |
| 4,567,851 A | * | 2/1986 | Larsen ................. A01K 1/0017 |
| | | | 119/524 |
| 4,893,587 A | * | 1/1990 | Bailey, Jr. .............. A01K 23/00 |
| | | | 119/869 |
| 4,967,693 A | * | 11/1990 | Prue ....................... A01K 15/02 |
| | | | 119/517 |
| 5,803,015 A | * | 9/1998 | Rhodes .................... A01K 1/12 |
| | | | 119/14.02 |
| 5,865,138 A | * | 2/1999 | van der Lely ........ A01J 5/0175 |
| | | | 119/14.02 |
| 6,269,767 B1 | * | 8/2001 | Hoppe .................. A01J 5/0175 |
| | | | 119/14.08 |
| 6,443,094 B1 | * | 9/2002 | DeWaard .................. A01J 7/04 |
| | | | 119/14.18 |
| 6,622,651 B1 | * | 9/2003 | Dessing ............... A01K 1/0023 |
| | | | 119/14.08 |
| 8,286,583 B2 | * | 10/2012 | Van Den Berg ........ A01J 5/007 |
| | | | 119/14.02 |
| 2001/0047765 A1 | * | 12/2001 | DeWaard ................. A01K 1/12 |
| | | | 119/14.03 |
| 2003/0062003 A1 | * | 4/2003 | Voogd ..................... A01K 1/12 |
| | | | 119/521 |
| 2003/0230243 A1 | * | 12/2003 | Van Der Lely ........... A01J 9/04 |
| | | | 119/14.08 |
| 2004/0154546 A1 | * | 8/2004 | Van der Lingen .... A01J 5/0175 |
| | | | 119/14.03 |
| 2011/0114024 A1 | * | 5/2011 | Van Den Berg ........ A01J 5/044 |
| | | | 119/14.02 |
| 2012/0272912 A1 | * | 11/2012 | Hofman ............... A01K 1/0103 |
| | | | 119/14.03 |
| 2012/0272914 A1 | * | 11/2012 | Hofman ................. B25J 19/023 |
| | | | 119/14.08 |
| 2018/0355894 A1 | * | 12/2018 | Brevet .................. F15B 21/006 |

FOREIGN PATENT DOCUMENTS

| | | | | |
|---|---|---|---|---|
| CA | 2817043 A1 | * | 7/2012 | ................ A01J 7/00 |
| DE | 515154 C | * | 12/1930 | ........... A01K 15/028 |
| DE | 3932034 A1 | | 4/1991 | |
| DE | 202016005231 U1 | * | 9/2016 | ......... B25J 11/0045 |
| EP | 0384531 A1 | | 8/1990 | |
| EP | 384531 B1 | | 12/1993 | |
| EP | 845208 A2 | | 6/1998 | |
| FR | 2477370 A1 | | 9/1981 | |
| NZ | 506883 A | | 3/2003 | |
| WO | 1993018646 A1 | | 9/1993 | |
| WO | 2001030134 A1 | | 5/2001 | |
| WO | 2001033951 A1 | | 5/2001 | |
| WO | 0151892 A1 | | 7/2001 | |
| WO | WO-2008130218 A1 | * | 10/2008 | ............. A01K 23/00 |
| WO | 2015088345 A1 | | 6/2015 | |
| WO | WO-2018203801 A1 | * | 11/2018 | ................ A01J 7/00 |

OTHER PUBLICATIONS

Jose Castelan, "How make a cow pee!!!", Jul. 14, 2013, https://www.youtube.com/watch?v=GqJRtKGfSvQ, last visited Jul. 23, 2020.

* cited by examiner

TOILET FOR CATTLE, IN PARTICULAR FOR COW

FIELD OF THE INVENTION

The invention relates to a toilet for cattle, in particular for cow.

BACKGROUND OF THE INVENTION

In animal husbandry, in particular in animal houses, a well-known problem is the emission of ammonia. This generally is thought to be caused by mixing of urine and faeces. This assumption is well known in the art. Several directions of solving this problem are suggested. Some solutions relate to the modification of stables, other solutions relate to the training of the animals.

Other solutions relate to special appliances that are used for catching the excrement from the animals in a separate manner and keeping them separate. Most of these solutions are more or less permanently attached or coupled to the animals.

In relation to some of these solutions mentioned above, reference is made to the documents cited next.

EP384531 according to its abstract describes: "A device for feeding dairy animals comprises means for receiving the droppings of the animal. The device is of such a structure that the animal is encouraged to deposit its droppings in the device. These means are formed by a closet structure, including a depositing area (9), i.e. the area where a dairy animal should deposit its droppings. The closet structure (9) is provided with sensor means (21) to establish whether an animal has deposited its droppings or not, and with retaining means (12, 13) to retain an animal in the closet structure (9) till the animal has deposited its droppings, whereafter a feeding system (15) to offer the animal fodder can be energized."

EP845208 according to its abstract describes: "The training device provides a warning for the cow upon contact, for preventing the cow from moving out of the correct position in which the excrement is received by a gutter at the rear of the stall. It uses an electrical conductor (7) coupled to a voltage source, with an attached frame (11) suspended at a given distance from the back of the cow and having a contact element which closes when the frame is contacted by the cow, to provide a current pulse repulsing further movement."

FR2477370 according to its abstract describes: "The animal excreta collection device is particularly for a dog, and comprises a sack (10) with a top opening secured to the perineum of the animal. The edge of the opening has two opposite tongues, there being two long straps each side of one tongue and two short ones each side of the other. A plate fits over the base of the spine in front of the root of the tail, and has fixing devices for the long straps (24), which pass round the thighs, and the short ones (22), which grip the base of the tail tightly."

NZ506883 according to its abstract describes: "A dispenser is attached to an animal such as a cow (cattle beast) and includes a reservoir and a valved opening to allow a flowable substance including a nitrification or urease inhibitor such as ammonium thiosulphate to flow from the reservoir in response to the animal urinating. Preferably the reservoir is attached to the tail of the cow and the valve is opened to permit flow of the substance out of the reservoir when the cow raises its tail for a prolonged period during the act of urination. A dispenser is attached to an animal such as a cow (cattle beast) and includes a reservoir and a valved opening to allow a flowable substance including a nitrification or urease inhibitor such as ammonium thiosulphate to flow from the reservoir in response to the animal urinating. Preferably the reservoir is attached to the tail of the cow and the valve is opened to permit flow of the substance out of the reservoir when the cow raises its tail for a prolonged period during the act of urination."

U.S. Pat. No. 2,853,052 according to its abstract describes: " . . . This invention relates generally to a cow positioning device, and particularly to such a device for causing the cow to move rearwardly in her stall whenever the cow's back is humped."

U.S. Pat. No. 3,038,444 according to its introduction describes: "The instant invention relates to improvements in animal controlling or restraining devices to be utilized in dairy barns and the like and deals particularly with an electrical device designed to automatically electrically shock a dairy cow should the animal stand with its hind feet in the usual gutter at the rear of the stall. Devices of this general character now in use provide an electrical system which energizes a vertically adjustable contact member suspended from an electrically charged wire disposed above the stall. While such systems do in fact perform their intended functions they are far too expensive and complicated to install and to adjust considering the short time that a training device is needed. It is a well-known fact that after a few instances of receiving a shock a cow will stand in the proper place within the stall.

A feature of this invention resides in the provision of a training device which can be readily swung into place behind a cow and which may be readily swung out of the way when not in use. This feature eliminates the tedious necessity of adjusting the device to fit individual animals."

U.S. Pat. No. 3,827,403 according to its abstract describes: "A urination-defecation trainer for animals comprising an energy transmitting means for defining a limited, chosen area, portable means carried by the animal and attached to its tail for sensing the angular orientation thereof and for providing an output when the animal raises its tail while standing. The portable means carried by the animal also receives the transmitted energy in the chosen area, and physically stimulates or shocks the animal. The portable means is responsive to the sensing means and the receiving means for selectively activating the stimulating or shocking means when the animal raises its tail dependent upon the location of the animal relative to the chosen area."

WO0151892 according to its abstract describes: " . . . a sensor for detecting movements, especially the tail movements of cows. Said sensor contains a horizontal section which is mounted in such a way that it can rotate about a pin and which is connected in such a way that it interacts with a movement to be measured, a spring element and a sensor element. A corresponding signal is generated by an evaluation/control unit.

WO1993018646 according to its abstract describes: " . . . an apparatus to teach cows to lie down in the cubicles which are to be found for that purpose in the stable instead of lying down on the wet dirty floor of the passageway. The apparatus according to the invention is fastened on the cow with a girth and measures the electric resistance of the floor on which the cow is going to lie down. If the animal is going to lie down on a floor with a low electric resistance the apparatus produces some sound signals, if the animal does not react by standing up this is followed by an electric shock."

WO2015088345 according to its abstract describes: "Method for reducing ammonia emission from an animal housing, and improved animal housing, including providing a first area for defecating, and providing a second area, separate from the first area, for urinating, and encouraging the animal to defecate only in the first area and to urinate only in the second area."

https://youtu.be/D3T3Xq3HL1o shows a method for stimulating cow to urinate.

DE3932034 in its abstract states "The cleaning system using an electronic, mechanical, pneumatic or hydraulic control, uses a transport carriage which carries a collection container for the dirt from each sty, the collection container adjusted vertically relative to the horizontally displaced carriage. The supply for the drive motor can be provided by a battery or a mains transformer, with the movement controlled by the presence of the pig to allow the container to track the pig's movement, with an IR light barrier used to control its return to the rest position. ADVANTAGE— Efficient soil collection for reduced risk of infection etc.".

CA880679 in claim states "A system for collecting urine from an animal comprising, a collecting device adjustably connected to a fixed structure, said fixed structure permitting limited side movement of said animal relative to said collecting device, a plurality of elastic means connecting said animal to said fixed structure, said elastic means being biased to relatively position said animal and said collecting device to a position wherein said collecting device may receive urine from said animal.".

SUMMARY OF THE INVENTION

A disadvantage of prior art is that it in some cases requires an animal to be "trainable". In other solutions, items need to be attached to an animal.

Hence, it is an aspect of the invention to provide an alternative for separating a solid and a liquid fraction of excrements, which preferably further at least partly obviates one or more of above-described drawbacks.

Currently, there is provided a urine collection device for a cow, comprising:
 a positioner;
 a urine container coupled to said positioner;
 a sensor for detecting a cow position;
 a stimulator for stimulating a stimulation region of a cow, which stimulation region is ventrally with respect to a vulva of said cow, and
 a controller,
wherein said controller is functionally coupled to said sensor for in operation receiving a cow position of said cow, and said controller is functionally coupled to said positioner and said stimulator, said controller adapted for controlling said positioner for bringing said stimulator at said stimulation region and for stimulating said stimulation region of said cow in response to a cow position being within a predefined range, which stimulation starts a urination, and controlling said positioner for positioning said urine container from a storage position to a working position for receiving a subsequent flow of urine from said stimulated cow, wherein said urine container comprises a front end for providing at least part of said stimulator, and
 wherein said positioner comprises:
  an actuator;
  a positioning part connected to said actuator for positioning said urine container between a stored position and a working position;
  a height adjustment part connected to said actuator for setting a container set height;
  a pendula part coupling said urine container to said further positioner, said pendula part allowing a substantially free swing between a first swing position S1 and a second swing position S2 while maintaining said urine container front end substantially at a same height with respect to said cow, and having its equilibrium at said first swing position.

In general, an animals position refers to the location it is present. In particular, an animals position can refer to its 3D position in space. For instance, a sensor may be applied that not only detects of an animal is present, it also be able to detect the height of a least part of its back. More in particular, it may be possible to determine an animals posture, like for instance an arching of the back of an animal.

In an embodiment for effective stimulation and urine collection, it was found beneficial to position the urine collection device at an end fixed or displaceable with respect to a space, in particular a space that is designed for keeping an animal inside the space. In particular in an embodiment, such a space is designed to keep an animal at its position. Such a space is further referred to as a retaining space, a confinement space of a containment space. These terms will be used for expressing the same requirement. When an animal is in such a space, positioning of the urine container and of the stimulator, which positions are relatively delicate when a desired effect is to be achieved, is very much simplified. This will also keep the amount of parts at a minimum. This all contributes in making the device fail safe, safe and robust.

In an embodiment, the device is connected or fixed to an existing fencing system in a stable.

An example of a fencing system and in particular a retaining box that can be applied in the current device is described in Dutch patent NL2010780, filed 3 Jun. 2013 and published 13 Nov. 2013, and which is incorporated as is fully set forth. In a particular embodiment, fencing system of NL2010780 is used as retaining device, for instance using the embodiments of FIGS. 1-11.

In particular, it describes a fence system for livestock, comprising at least one gate mounted rotatable about a swing axis to said fence system and rotatable from a locked position blocking a passage for livestock, to an open position allowing livestock to use or pass said passage. Said swing axis is horizontal with respect to said passage. This allows said gate to swing up and away from said passage in said open position.

The fence system of the invention provides modular elements that allow freedom in the design of a stable layout. Furthermore, it comprises an access gate that is easy to operate and control, and uses relatively little floor space.

In this respect, a fence usually is a stationary part that for instance defines an end of a space or corridor or gateway. A gate usually is a movable part that allows passing or that blocks passage. Often, a pasture has a fence for keeping livestock in the pasture, and is provided with a gate allowing livestock to get out of the pasture when the gate is open.

The current invention in particular relates to a fence system for fencing off parts or spaces in a stable. These spaces may be as small as a feeding space or milking space for an individual animal Such spaces can be between 0.5 and 1.5 m wide and between 1 and 5 m long. The fence system allows parallel, directly adjacent spaces. Often, the fence system is used for fencing off a series of said spaces. Often, at least a number of said series of spaces are parallel, side by side. Often, these spaces have gates that are in-line.

In an embodiment, said gate comprises a substantially L-shaped gate which comprises a rotation gate part at an end rotatably couple to said swing axis, and a barrier part providing a barrier for blocking said passage.

In its locked position, the gate blocks said passage, and prevents livestock to pass the gate when it is closed. In this sense, closed means that livestock is unable to open the gate of their own motion. Usually, a farmer or a controller open the gate.

In an embodiment, said rotation gate part extend above said passage.

In an embodiment, said gate comprises an actuator for in operation moving said gate L-shaped gate between said open position and said locked position. In particular said actuator engages said L-shaped gate at a distance from said swing axis (R). In particular, said actuator engages said rotation gate part at a distance from said swing axis (R). More in particular it engages said rotation gate part near an elbow connecting said rotation gate part and said barrier part. The distance between the engagement of the actuator and the swing axis is non-zero. Often, the distance is between 0.5 and 3 m. The actuator may even engage as remote as an upper end of the barrier.

In an embodiment, said actuator is adapted to exert a force to said L-shaped gate along a working line, and wherein said working line is at an angle of between 10° and 90° with respect to said rotation gate part. More in particular said working line is at an angle of between 20° and 60° with respect to said rotation gate part.

In an embodiment, said actuator comprises a first end engaging said L-shaped gate at a distance from said swing axis (R) and a second end stationary with respect to said swing axis (R). Said actuator further comprising a first state and a second state, and in which a distance between said first end and said second end in said first state is smaller than in said second state.

In an embodiment, said actuator comprises an arm for exerting a force to said gate. In particular, said actuator comprises a pneumatic or hydraulic cylinder operative on said arm. The ends of the actuator can be hingingly coupled to the L-shaped gate and hingingly coupled to the actuator frame, respectively.

The urine collection device can be functionally coupled with a gate described in that patent. In an embodiment, the actuator used in some of these embodiments of the gate can be used to drive, or as part of, the positioner of the current urine collection device. The actuator that operates the gate can be used to also actuate the positioner. In such an embodiment, a reduction in parts and costs can be effected. This can also reduce the points of failure. Furthermore, it simplifies the control.

In an embodiment, the urine collection device further comprises a retaining device for retaining said cow at a predefined retaining area and within a corresponding retaining space, wherein said positioner and said sensors are positioned for operating at predefined locations with respect to said retaining area when in operation, in particular said working position is within said retaining space, and said sensor has a working range in said retaining area, more in particular said retaining area corresponds to a floor space of a standing cow.

In an embodiment, the retaining device comprises a fence for retaining an animal within said retaining area, and said positioner has a part connected to said retaining device.

In an embodiment, the retaining device comprises a gate having an open gate position for allowing access to said retaining area and a closed gate position for blocking said retaining area, and wherein said positioner comprises a part connected to said gate.

In an embodiment, the urine container has its storage position with respect to said gate, and remains in its storage position when said gate moves between its open gate position and its closed gate position, and is separately operable between its storage position and its working position when said gate is in its closed gate position.

In an embodiment, an end of said actuator is fixed with respect to said retaining area, and an end of said positioner is fixed to said urine container, and said positioner is adapted for positioning said urine container within at least part of said retaining space.

In an embodiment, an end of said positioner is fixed to said gate, and comprises a height adjustor for adjusting a height of said urine container with respect to said retaining space, in particular said height adjustor is coupled to an end of said pendula part opposite of said urine container.

In an embodiment, the pendula part comprises at least one pending arm, and said urine container is coupled via said at least one pending arm to allow a penduling motion.

In an embodiment, the pendula part comprises at least two pending arms, and urine container is coupled via said at least two pending arms at two urine container locations of the urine container at a distance from one another, and at such positions with respect to a centre of gravity of the urine container that the container has its equilibrium position at a forward swing position, and allowing said urine container to freely swing between its forward swing position to a rear swing position while maintaining the container front end functionally at a same height with respect to the retaining area.

In an embodiment, the height adjustment part comprises a lever having a pivot axis, one lever arm functionally coupled to said actuator and a second lever arm coupled to said pendula part, in particular said two pending arms coupled via a pivot coupling to said second lever arm, more in particular each pending arm having a pivot coupling to said second lever arm.

In an embodiment, one of the pending arms is part of a articulated arm comprising an elbow coupled at a fixed distance to a pivot coupling that has a position that is fixed with respect to said pivot axis of said lever, in particular said pending arm forming an under arm of said articulated arm.

In an embodiment, the stimulator comprises a bump-shaped extension on the urine container, in particular a bump-shaped extension on a rim of the urine container. The urine container can have a tapered end that ends in a bump. The tapering and bump can be adjusted in size in order to fit an animal, in particular a female animal. A cow, for instance, has a rear bone structure and the bum and taper can be adjusted to that size.

In an embodiment, the urine container comprises said bump-shaped extension at one end forming the front end of said urine container, a rear pending arm of said pending arms having one end attached at or near an opposite end of said urine container, and a front pending arm of said pending arms having one end attached between said bump-shaped extension and said attachment of said rear pending arm, in particular said rear pending arm having its one end attached between a centre of gravity of said urine container and said attachment of said first pending arm.

In an embodiment, the actuator comprises a pneumatic cylinder having a series of set extension positions comprising a first extension at which said urine collection device is at its storage position, a second extension at which said urine collection device is at its working position, and an extension range at operating said height adjustment part for moving said urine collection device to its set height.

In an embodiment, the urine container comprises an internal bottom that is functionally a circle section.

In an embodiment, the container comprises a urine container emptying device, wherein in particular said urine container emptying device comprises a urine removal tube functionally radially extending from a rotational axis of said urine container to said internal bottom.

In an embodiment, the sensor is further adapted for detecting an end of urination, and said controller is functionally coupled to said sensor for receiving a signal when said urination has ended, and said controller further controls said positioner for returning said urine container to its storage position.

In an embodiment, the urine container comprises a cleaning device inside said urine container and directed to an opening of said urine container.

In an embodiment, the urine container comprises an internal wall defining a urine storage space in said urine container, in particular said urine storage space is defined at said front end of said urine container.

The invention further pertains to a method for collecting urine from an animal using a urine collection device, in particular using the urine collection device currently described, comprising:
measuring a position of an animal with respect to said urine collection device;
in response to a measured position, positioning a urine container at a location with respect to an animal for receiving a flow of urine;
positioning a stimulator in response to said measured position at a stimulation location of said animal, and applying a stimulus for starting a flow of urine, said stimulus comprising applying pressure at a location ventrally to a vulva of said animal.

In an embodiment of the method, it further comprises:
during said flow or urine, measuring a parameter relating to said urination;
in response to a predetermined signal relating to said measured parameter relating to said urination indicating an end of said flow of urine, positioning said urine collection device at a storage position.

In an embodiment of the method, it further comprises:
during said flow or urine, measuring said position of said cow as a parameter relating to said urination.

The invention further pertains to a urine container, in particular for a urine collection device currently described, the urine container having a substantially bowl-shaped interior surface, comprising a urine-receiving opening, and a urine-holding space defined by a partitioning wall in said urine container and having a passage for providing a fluid communication between said urine-receiving opening and said urine-holding space.

The invention further pertains to a computer program product for running on a controller of the urine collection device currently described, wherein said computer program product, when running on said controller comprising a data processor:
retrieves a position of an animal with respect to said urine collection device from said sensor;
in response to said animal position, positioning a urine container at a location with respect to said animal for receiving a flow of urine;
positioning a stimulator in response to said measured position at a stimulation location of said animal, and applying a stimulus for starting a flow of urine.

In an embodiment of the computer program, during said flow or urine a parameter relating to said urination is retrieved from said sensor, and in response to a predetermined property of said measured parameter relating to said urination indicating an end of said flow of urine, positioning said urine collection device at said storage position.

In a broad sense, the invention pertains to a urine collection device for an animal, in particular a cow, comprising a positioner, a urine container coupled to said positioner, a sensor for detecting a cow position, a stimulator for stimulating a stimulation region of a cow, which stimulation region is ventrally with respect to a vulva of said cow, and a controller. In an embodiment, the controller is functionally coupled to said sensor for in operation receiving a cow position of said cow, and said controller is functionally coupled to said positioner and said stimulator, said controller adapted for controlling said positioner for bringing said stimulator at said stimulation region and for stimulating said stimulation region of said cow in response to a cow position being within a predefined range, which stimulation starts a urination, and controlling said positioner for positioning said urine container from a storage position to a working position for receiving a subsequent flow of urine from said stimulated cow.

In a further embodiment, the urine container comprises a front end for providing at least part of said stimulator.

Various details shown in the current application may be included in the urine collection device.

The invention further pertains to a urine container as described so far, and in the particular embodiments. Such a urine container may be provided with a urine container emptying device as detailed, and/or with a urine container cleaning device.

The terms "upstream" and "downstream" relate to an arrangement of items or features relative to for instance a flow of liquid. Usually, in a gravitational field, a liquid flows from an "upstream" location to a "downstream" location.

The term "substantially" herein, such as in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally" will be understood by, and be clear to, a person skilled in the art. The term "substantially" as well as "functionally" may also include embodiments with "entirely", "completely", "all", etc. Hence, in embodiments the adjective functionally may also be removed. When used, for instance in "functionally parallel", a skilled person will understand that the adjective "functionally" includes the term substantially as explained above. Functionally in particular is to be understood to include a configuration of features that allows these features to function as if the adjective "functionally" was not present. The term "functionally" is intended to cover variations in the feature to which it refers, and which variations are such that in the functional use of the feature, possibly in combination with other features it relates to in the invention, that combination of features is able to operate or function. For instance, if an antenna is functionally coupled or functionally connected to a communication device, received electromagnetic signals that are receives by the antenna can be used by the communication device. The word "functionally" as for instance used in "functionally parallel" is used to cover exactly parallel, but also the embodiments that are covered by the word "substantially" explained above. For instance, "functionally parallel" relates to embodiments that in operation function as if the parts are for instance parallel. This covers embodiments for which it is clear to a skilled person that it operates within its intended field of use as if it were parallel.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterising features described in the description and/or shown in the attached drawings. The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily on scale

DESCRIPTION OF PREFERRED EMBODIMENTS

Figure 1:
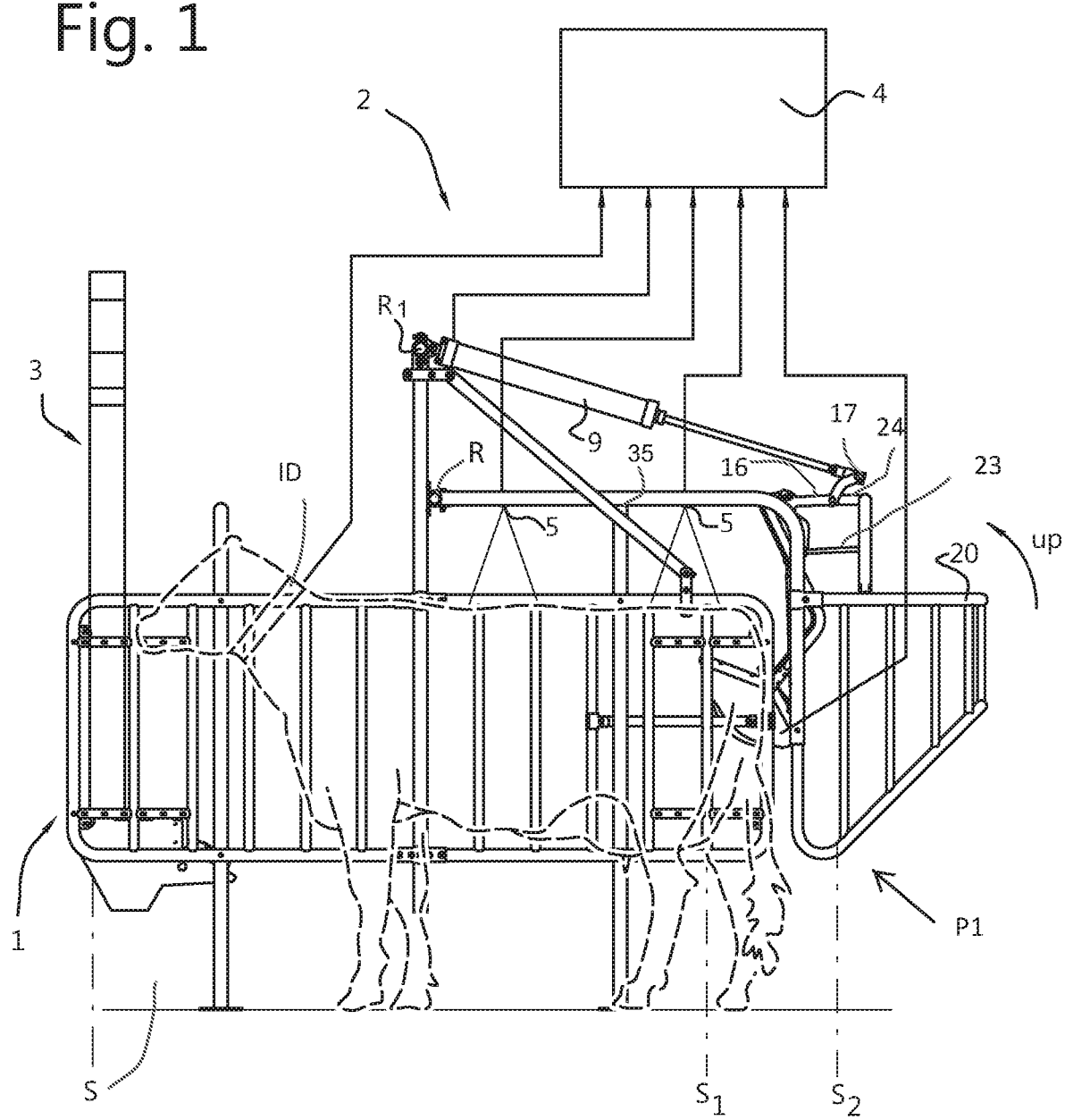
FIG. 1 schematically depicts a side view of an embodiment of a urine collection device for a cow.

FIG. 1 schematically depicts a cow projected on, and in the center of, a containment/retaining/containment device 1 provided with an embodiment of a specific urine collection device 2. The containment device 1 in this embodiment also has a feed station 3. Such a containment device 1 without the urine collection device 2 is already shown in NL2010780 of the applicant. Other embodiments of suitable confinement devices may also be considered. Further devices like a milking robot may be included, but not indicated here. Additional details of for instance a stable like floor provisions having urine and/or faeces passages and containment are also not indicated her, but may be added or included. The confinement device 1 has a gate 20 that can swing about rotation axis R that is here perpendicular to the drawing. The gate thus can swing in the direction indicated with UP. This allows an animal to enter a confinement space S defined and bounded by the confinement device 1. The confinement device 1 here has an actuator 9 that actuates the gate 20 between a closed and an open position. As will be explained below, in the current embodiment the actuator 9 that operates the gate 20 will also actuate the urine collection device 2. Here the actuator 9 is a pneumatic cylinder, but other actuators like an hydraulic cylinder, a suitable electromotor or several electro motors may also be used. The current embodiment uses simple means that are robust and affordable, having components that as such are proven.

In FIG. 1, the urine collection device 2 is in a working position P1.

Schematically indicated is a controller 4 that is part of the urine collection device 2. Furthermore, two sensors 5 are indicated. The urine collection device 2 in fact comprises several functional parts that are introduced in FIG. 2 first, before indication embodiments these functional parts in an embodiment.

In the embodiment of FIG. 1, the urine collection device 2 is at various parts fixed to parts of the confinement device 1. In fact, in integration of the confinement device 1 with the gate 20, one end of the actuator 9 is fixed to the confinement device 1, and other parts of the urine collection device 2 are coupled or fixed to the gate 20. This here simplifies installation in a stable. In another embodiment, an end of the positioner 6 can be fixed or have a fixed position with respect to a stable.

Figure 2:
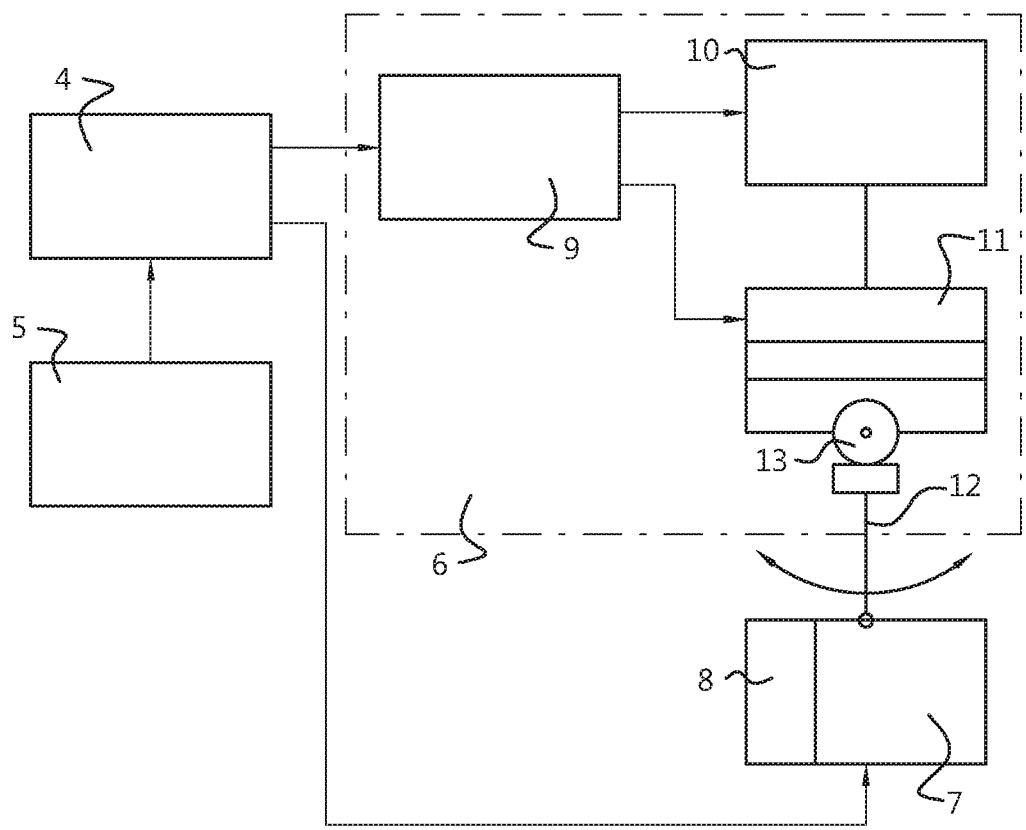
FIG. 2 shows schematically in functional parts a urine collection device.

In FIG. 2, schematically various parts of the urine collection device 2 are schematically indicated in order to first define the functional parts, before explicitly showing embodiments.

The urine collection device 2 comprises a controller 4 that is already introduced before. The controller 4 may be a computer device that is physically located at the premises of a stable. It may also be remote. The controller 4 may also be or comprise a distributed computer system. In an embodiment, the controller 4 is or comprises a PLC (programmable logical circuit) unit or functionally similar unit. The controller 4 can be provided with a computer program product that comprises controller instructions for operating the controller 4 for preforming steps that are described in this application.

The urine collection device 2 further comprises a sensor means 5 comprising one or more sensors. One of the sensors is adapted for detecting an animal position. Such a sensor may comprise a camera, a proximity sensor, an ultrasound sensor, or similar sensor for detecting or sensing an animal distance.

In an embodiment, one or more ultrasonic sensors are applied. When the sensors are positioned substantially along a longitudinal central line of the confinement space S, a detection of an animal height can be done. In particular, when one sensor is positioned at about the center of the longitudinal central line, and another sensor is positioned at a distance near a rear of the confinement space S, it is possible to detect an arching of a back of an animal. Usually, these two sensors are about 50 cm-100 cm apart. If it is possible to follow the shape change of the back, for instance arching, it is possible to detect a start of urination. Especially when an animal is provided with a unique animal ID and the controller is provided with unique animal parameters like animal size, this information can be combined with measured sensor data by the controller 4 in order to measure more accurately an animal's position, height and even body posture.

The sensor means 5 is functionally coupled to the controller 4. The coupling allows receipt of data from the sensor means 5. In an embodiment, the sensor means 5 is functionally coupled to the controller 4. This functional coupling may include a wired or wireless coupling.

The controller 4 in operation can receive data from the sensor means 5. The controller 4 in an embodiment can exchange data with the sensor means 5. The controller 4 can send instruction to the sensor or sensors of the sensor means 5 for operation, calibration, and the like.

In FIG. 2, the urine collection device 2 further comprises a positioner 6, schematically indicated with a dotted line. The positioner 6 is functionally coupled to controller 4. Coupled to the positioner 6 are a urine container 7 and a stimulator 8. The positioner 6 may comprise a robot arm, for instance a robot arm having at least 3 degrees of freedom. In an embodiment, the positioner 6 is adapted to position the urine container 7 and the stimulator 8 within the confinement space S defined by the containment device 1 or containment fence 1.

Stimulator 8 is provided for stimulating a region that sets in operation a urination when a bladder of an animal holds an amount of urine that can be excreted. The stimulator 8 in an embodiment stimulates a stimulation region that for instance for a cow is located ventrally below the vulva. The stimulator 8 may comprise a mechanical part that is shaped to be pressed against the stimulation region. Other embodiments may be conceptualised, for instance producing s sound wave vibrating the stimulation region, or even producing an electromagnetic field that stimulates the stimulation region.

In an embodiment, the stimulator 8 is integrated into the urine container 7. This very much simplifies the urine collection device 2, and makes it more robust.

In an embodiment, the positioner 6 comprises an actuator 9. The actuator 9 can actuate various further parts of the positioner 6.

In an embodiment the positioner 6 comprises a positioning part 10 that allows the urine container 7 and the stimulator 8 to move between a working position P1 and a storage position P2. In FIG. 1, the working position P1 is indicated, in FIGS. 4 and 7 the storage position, protected by the gate 20.

In an embodiment, the positioner 6 comprises a height adjustment part 11. The height adjustment part 11 in operation allows the urine container 7 and the stimulator 8 to move between a first height H1 and a second height H2, and set a urine container height Hu and a stimulator height Hs.

In an embodiment, the positioner 6 comprises a pendula part 12 that allows the urine container 7 and stimulator 8 to swing between a first or front position S1 and a second or rear position S2. In FIG. 1, the positions S1 and S2 are indicated.

In an embodiment, as will be illustrated below, the pendula part 12 is adapted for allowing the urine container 7 and the stimulator 8 to swing while functionally retaining their set height H. The balance of a combination of at least the urine container 7, the stimulator 8 and the pendula part 12 can be such that in an equilibrium position, in particular with the urine container 7 empty, the urine container 7 and the stimulator 8 are in a first or front position S1. This front position S1 is laid out in the confinement space in such a way that the stimulator 8 is at the stimulation area, in particular pressing against the stimulation area, even if the animal is at a front position in the confinement space S. In such an embodiment, at least the urine container 7 will be located near or pressed against the rear of the cow and remains at that relative position with respect to the animal even if the animal displaces to the rear of the confinement space S.

Figure 6:
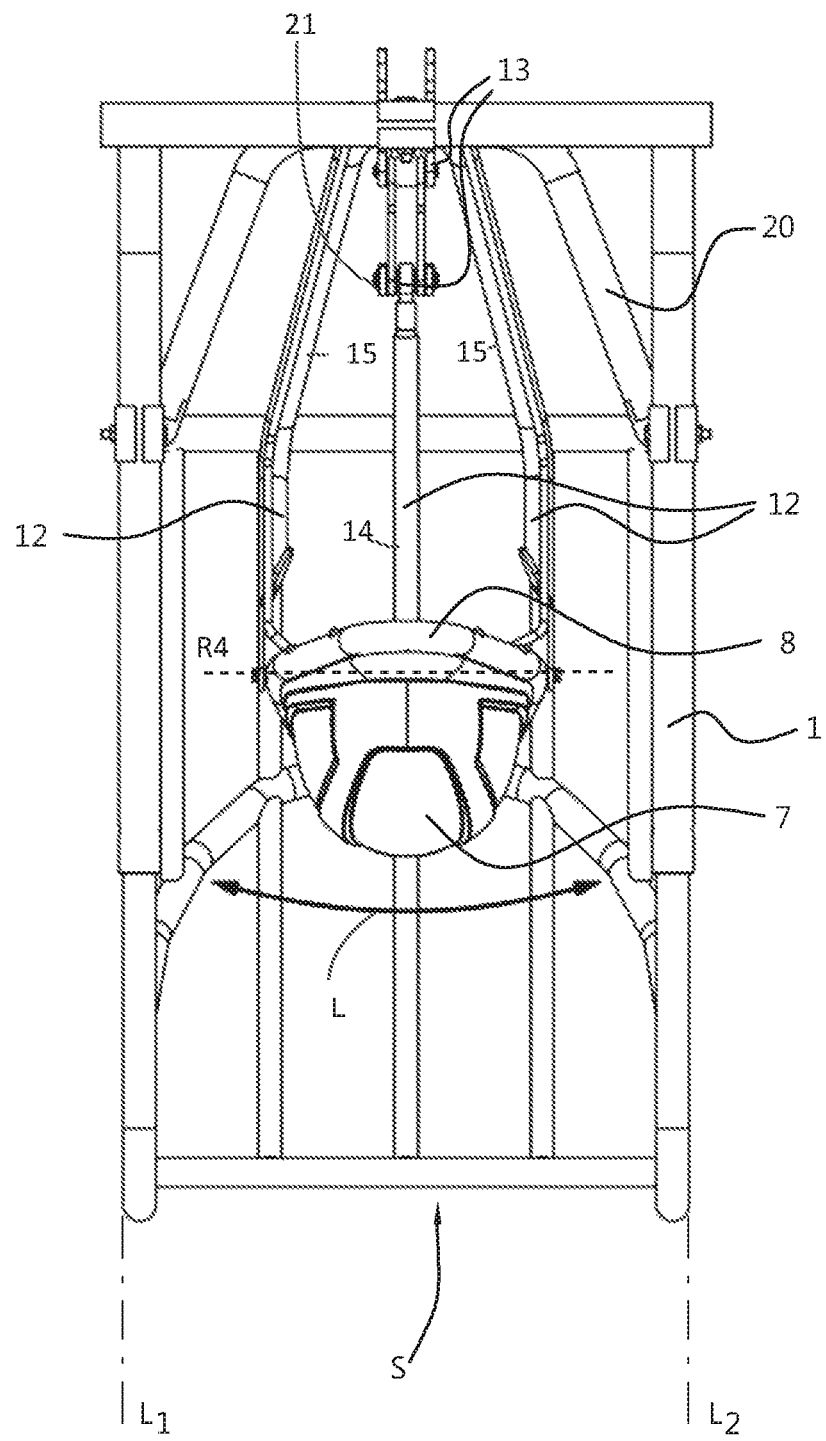
FIG. 6 shows a rear view of part of the embodiment of FIG. 1, with indication showing a motion of the urine container following a sideward displacement of an animal, a lateral displacement or lateral swing.

In a further embodiment, the positioner 6 comprises a lateral pendula part 13 that allows the urine container 7 and the stimulator 8 to swing in a lateral direction L (in and out of the paper) in order to follow sideward displacement of a cow in the confinement space S. In an embodiment, the urine container is designed such that it has its equilibrium at the center of the confinement space as indicated in FIG. 6.

If the positioner 6 is provided with the lateral pendula part 13, at least the urine container 7 will be located near or pressed against the rear of the cow and remains at that relative position with respect to the animal when the animal move sidewards with its rear. The lateral pendula 13 allows the urine container and the stimulator to follow an animals movement laterally, between a lateral position L1 and a lateral position L2. Usually, the lateral equilibrium will be functionally at a longitudinal center of the confinement space S.

Figure 3A:
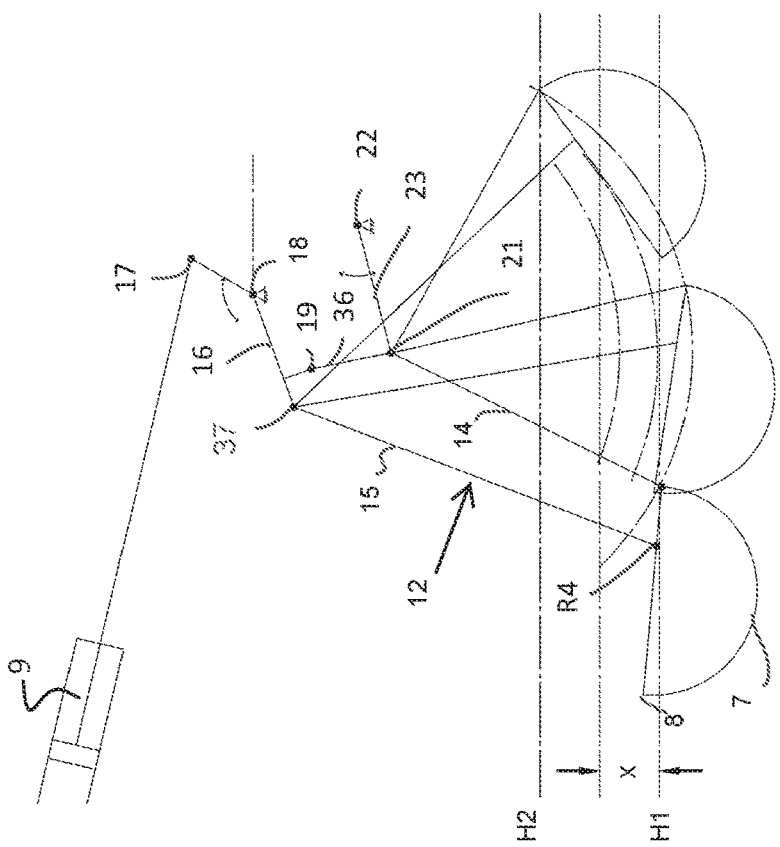
FIGS. 3A and 3B schematically show mechanical principles of the urine collection device.
Figure 3B:
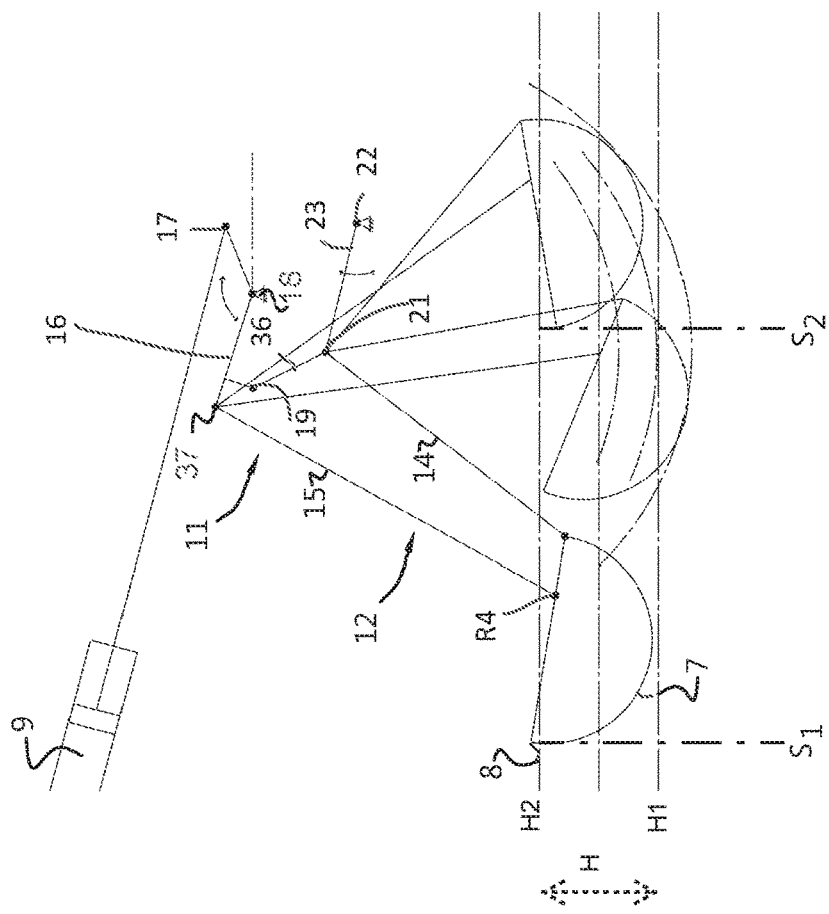

In FIGS. 3A and 3B, the motion of various parts of the positioner 6 are illustrated schematically. In FIG. 3A the urine container 7 and stimulator 8 are at a highest position H2, and in FIG. 3B the urine container 7 and stimulator 8 are at a lowest position H1. The urine container 7 is pending on arms forming the height adjustment part 11 and directly on the pendula part 12. The pendula part 12 here has a front pending arm 15 and a rear pending arm 14. The rear pending arm 14 is hingingly attached to or near an end of the urine container 7. A front pending arm 15 is hingingly coupled at a distance (longitudinally) from the rear pending arm 14. At their opposite ends, the rear pending arm is hingingly coupled to an arm of a lever 16, which in this embodiment is an angled lever 16 and the front pending arm 15 is hingingly connected to an arm of that angled lever 16, i.e., a lever having its arms at an angle α. The angles lever 16 is positioned with its pivot coupling 18 at a fixed position. In an embodiment, its position is fixed with respect to gate 20. The other, actuated arm of the angled lever 16 is connected with pivot coupling 17 to the actuator 9. The various mutual dimensions and ratio of distances are such that the actuator 9 by operating on the actuated arm of the angled lever 16 changes the position of the hinges or pivot couplings 19, 37 of the rear and front pending arms 14, 15 and thus allows setting of the set height H. The mutual length of the rear and front pending arms 14, 15 and the ratio of mutual distance at which they are connected to the urine container 7 and the longitudinal length of the urine container 7 allow the free pendulating or swinging or nutating or shuttle motion between positions S1 and S2 of the urine container 7 that keeps a stimulation end 8 of the urine container 7 functionally at a same height with respect to the floor of the confinement space S. In the above, reference is made to "arms" referring in fact to ridged bars or the like.

In a particular embodiment, for further optimizing the height setting and swing of the urine container 7, the hinged coupling of the rear pending arm 14 comprises a hinge connection to a first end of a further arm 23 that has its other, opposite end hingingly fixed via a pivot coupling 22 fixed here to the gate 20. The first end of that further arm 23 is further hinging connected via pivot coupling 21 to yet another arm 36 that has its opposite end hingingly connected via pivot coupling 19 to one of the arms of the angled lever 16 that is also hingingly connected via the pivot coupling 37 to the front pending arm 15. Actuation of one arm of the lever 16 thus adjusts a height of the front pending arm 15 and rear pending arm 14, or in facts their upper pivot couplings 19 and 37. An other part of the pendula part 12 is formed by rear pending arm 14, further arm 23 and yet further arm 37, it was found possible to swing the urine container 7 while holding its end almost at a constant height. In other words, the pendula part 12 has a rear suspension comprising an articulated arm composed of yet further arm 36 forming the "upper arm", and rear pending arm 14 forming the "under arm". The elbow 21 of the articulated arm is via pivot coupling 21 attached through an further arm 23 to a fixed position via a further pivot coupling 22.

In order to have a center of gravity and equilibrium of the pendula part 12 with urine container 7 at swing position S1, in an embodiment the front pending arm 15 is angled.

This is for instance depicted in FIG. 1. The equilibrium can even be beyond swing position S1, in which case a blocking cam or other blocking position can be provided to prevent a swing beyond swing position S1.

In an embodiment, the sensing means 5 determine an animal's position, animal body posture, and for instance an arching of an animal's back. When an arching of the back of the animal is detected, indicating a start of urination, the controller 4 controls the height adjustment part 11 to follow a change of height of the rear of an animal. In fact, as soon as an arching of the back starts, the urine container 7 of the current embodiment will be lowered a little, here by reducing the extension of the pneumatic cylinder (see FIG. 3B).

Figure 4:
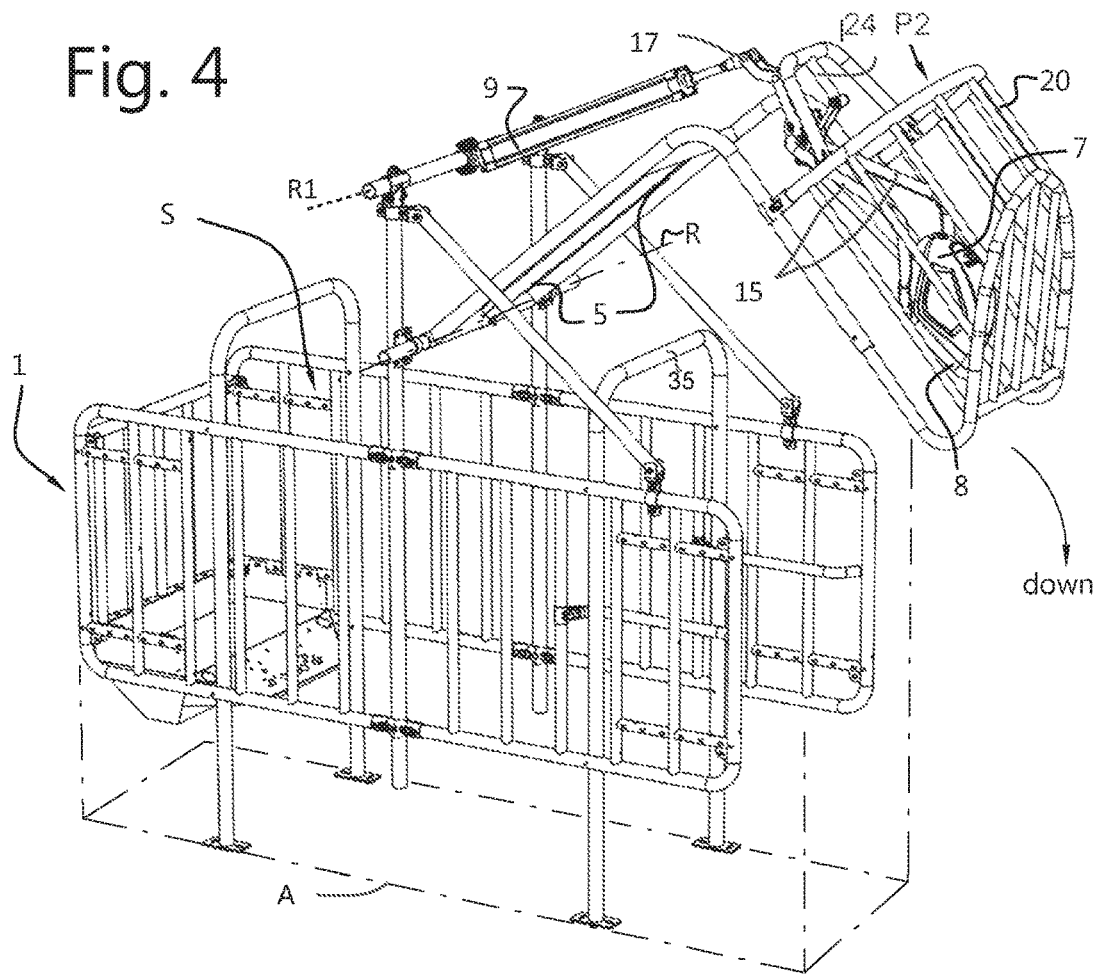
FIG. 4 shows the embodiment of FIG. 1 in perspective view from the rear, with a confinement device gate opened.

In FIG. 4, the confinement device 1 with opened gate 20 of FIG. 1 for allowing an animal access to the confinement space S is depicted. In this drawing, the closing direction of the gate 20 is indicated with "DOWN", and again the confinement space S is indicated. Gate 20 rotates about gate rotation axis R indicated. In the storage position P2 with respect to gate 20, the gate 20 protects most elements or parts of the urine collection device 2.

The urine collection device 2 is shown in the storage position P2. In this embodiment, the sensor means 5 is integrated in an arm of gate 20, defining their position with respect to the world/the confinement space S/an animal. When the gate 20 is lowered, into its closed position (of FIG. 1), the urine collection device 2 remains in its storage position P2. When the gate is closed, in the current embodiment the actuator 9 continues working. Here, the cylinder extends further. This brings the urine collection device 2 in its working position P1 of FIG. 1.

Figure 5:
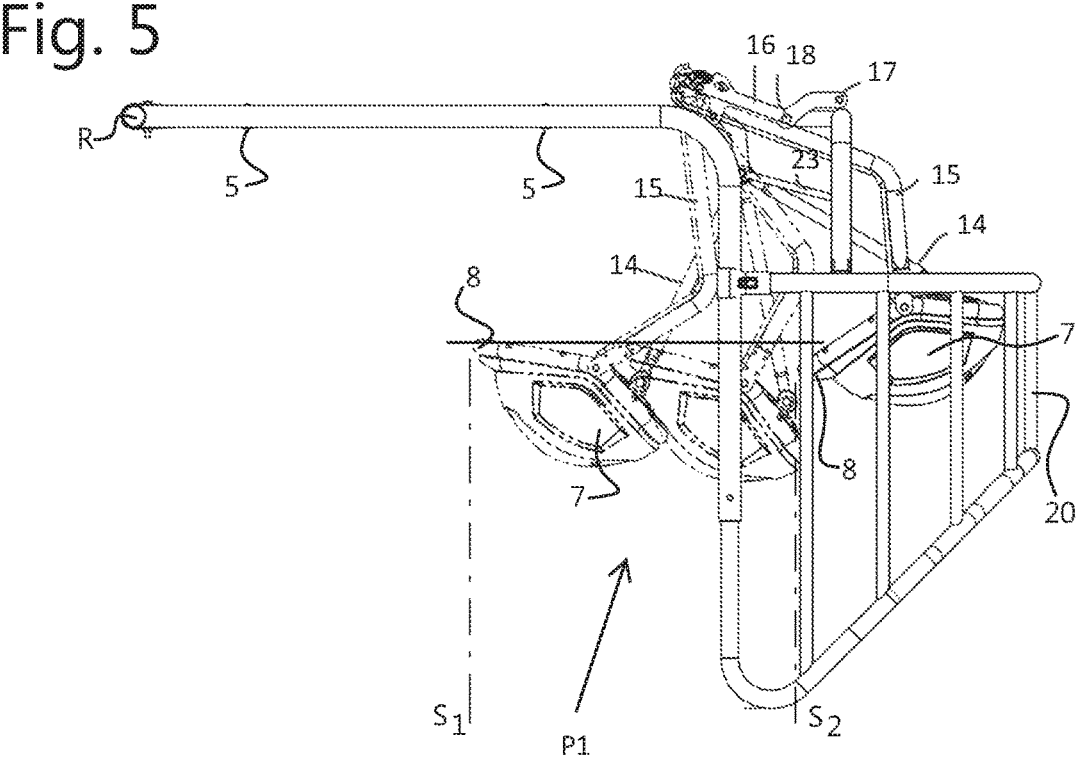
FIG. 5 a gate with large part of a urine collection device in three swing positions.

In FIG. 5, the gate 20 in its closed position is depicted, and in two additional dotted representations it is indicated how the pendula part 12 allows the urine container 7 and the stimulator to freely swing between position S1 and S2. As explained, in rest the most forward swing position S1 will be taken. An animal can move backward in the confinement space S, pushing the urine container 7 and the stimulation backwards up to swing position S2 while the urine container and in particular the stimulator 8 keep pressing against the animal. During this swing, the urine container 7 and stimulator 8 maintain their height, indicated by the solid line.

In FIG. 6, the effect of the lateral pendula part is indicated. This part allows the urine container 7, the stimulator 8 and the pendula part 12 to freely swing between the lateral positions L1 and L2. In this case, the equilibrium is the position in which the urine container 7 is depicted. When an animal moves in a lateral direction, this provision presses the stimulator 8 and urine container 7 against the animal and keep it at that stimulation position or at a position for collecting the urine. In fact, the stimulator 8 is here tapered for fitting the bone structure of a cow, while the pendula part 12 will press the stimulator 8 there. Thus, when the animal moves back or forth within the confinement space, or sideward, the stimulator 8 with the urine container 7 will remain positioned with respect to the animal.

Figure 7:
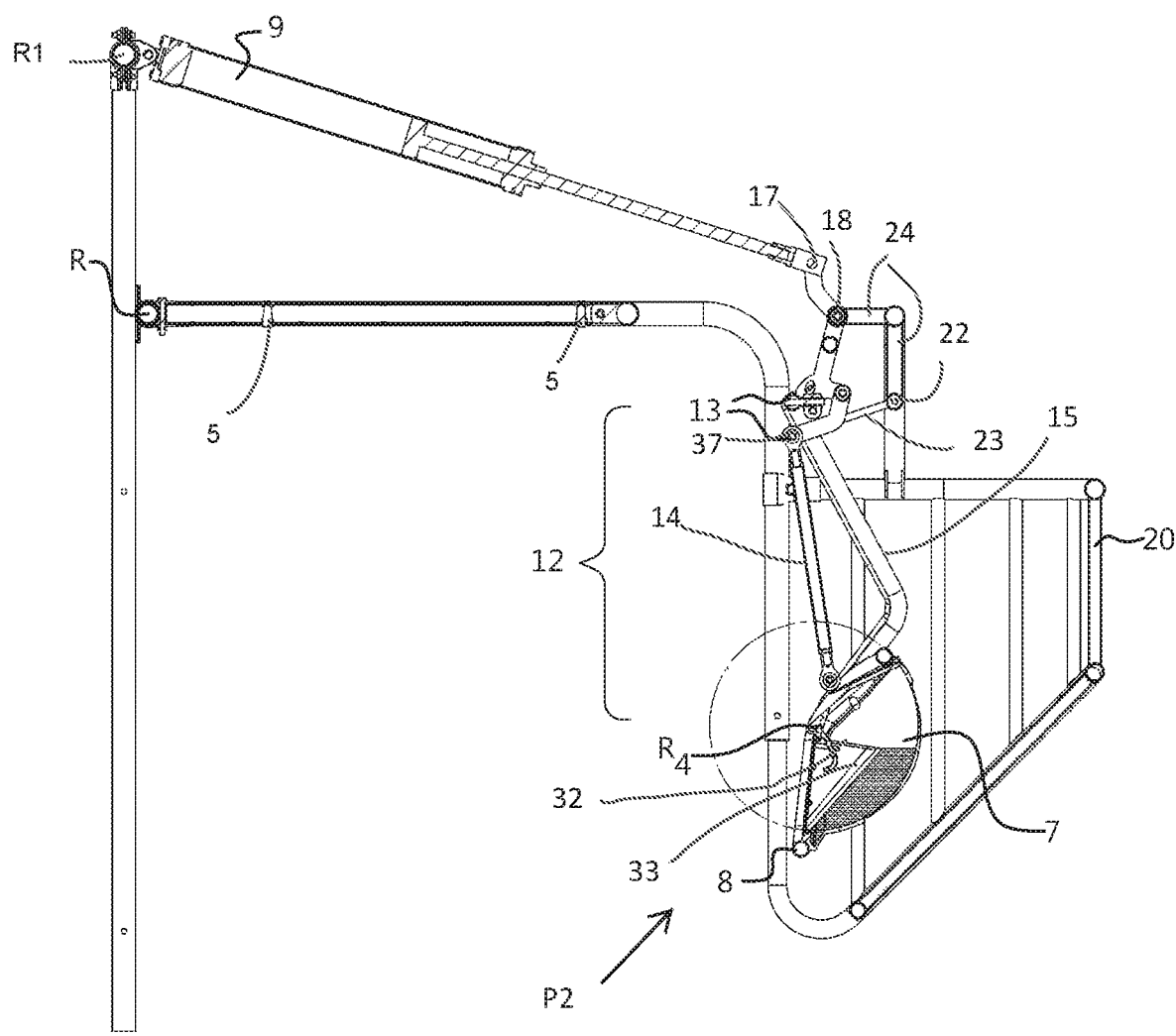
FIG. 7 shows a cross section of an embodiment of a urine collection device and gate with the urine collection device in a storage position.

In FIG. 7, a cross sectional view at the longitudinal center line of the confinement space S is shown. The urine collection device 2 is in the storage position P2 in the lowered gate 20. The urine container 7 is here fully filled with urine. A urine sensor will send a signal to the controller 4 that urine is present in the urine container 7, and a pumping device will pump the urine container empty of urine.

In the urine container 7, furthermore an end of a cleaning device 30 is shown which is directed toward a urine inlet opening 26 of the urine container 7. The cleaning fluid tube with nozzle is fluidly coupled to a cleaning liquid line running here along one of the arms of the pendula part 12.

When the controller 4 controls the pneumatic cylinder of the actuator 9 to extend further, it will bring the urine collection device 1 in the working position P1 of FIG. 1.

Figure 8:
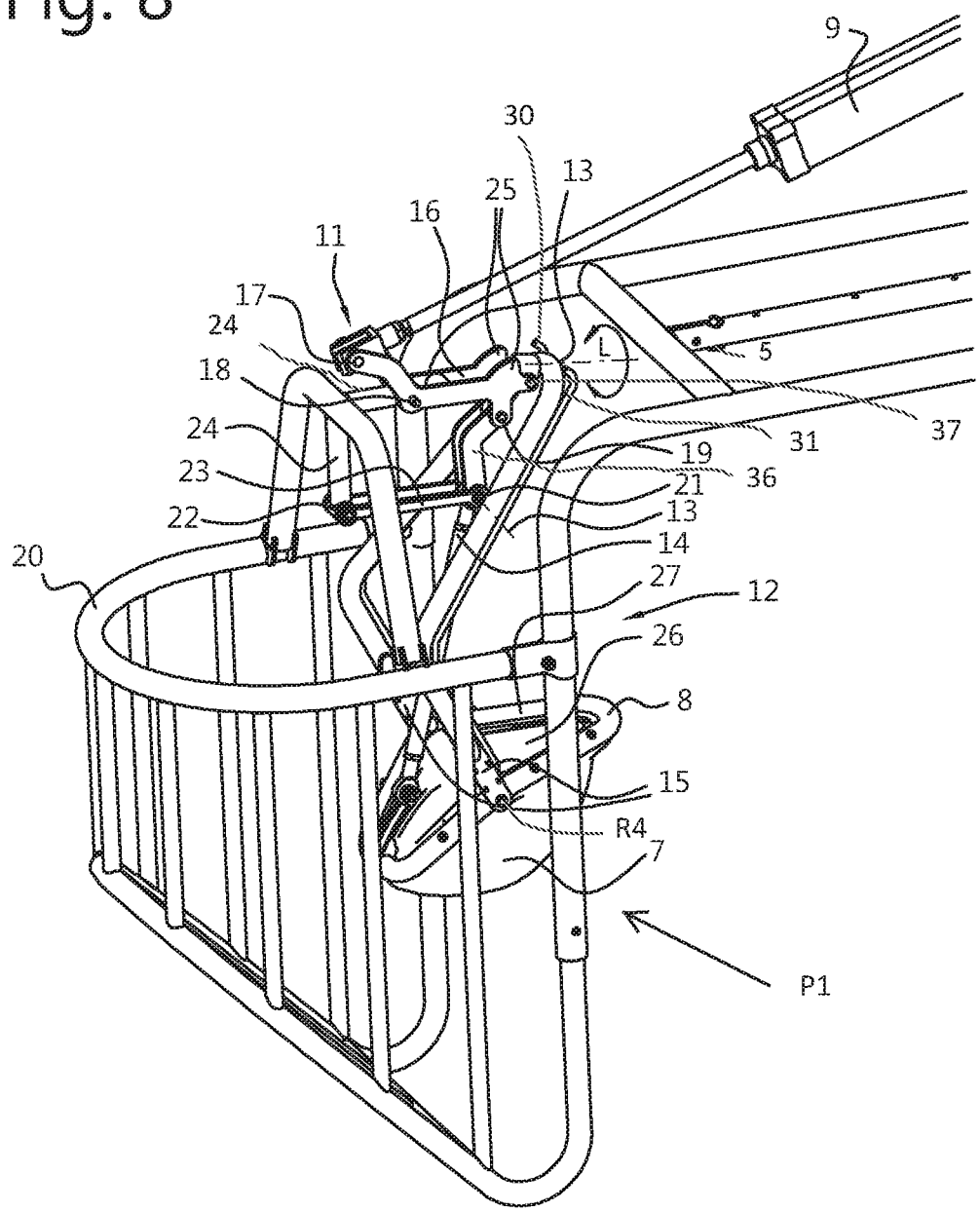
FIG. 8 shows a detailed perspective view of part of the embodiment of the urine collection device of FIG. 1.

FIG. 8 shows the various arms and levers of motion transfer parts of the urine collection device 1 that form part of the height adjustment part 11, the positioning part 10 and the lateral pendula part 13, and shows the connection of the pendula part 12.

As already explained in the schematic drawings of FIGS. 2 and 3, actuator 9 is hingingly coupled at hinge or pivot coupling 17 to an arm of angled lever 16. The angled lever 16 has a pivot axis coupling 18 which is fixed to gate 20 via one of angled connecting bars 24. The opposite arm of the angled lever 16 has one pivot axis or hinge coupling 19 fixed to a further connecting arm 36 which in turn has a pivot axis coupling 21 which is fixed to the rear pendula arm 14. A connecting arm 23 also hingingly connects the rear pendula arm 14 at pivot axis coupling 21. In fact, in the current embodiment the pivot coupling 21 and lateral pendula part 13 are combined in a block with the pivot axis 21 and perpendicularly a further rotational axis 13 for providing the possibility for lateral motion L, thus providing part of the lateral pendula part 13 as indicated.

The angled lever 16 with the pivot couplings and connecting bars provide a height adjustment part 11. The pivot coupling 17 of the actuator 9 with the angled lever 16 allows a coupled height adjustment of the front and rear pendula arms 15 and 14.

The angled lever 16 further comprises a blocking part 25 on the already-discussed other arm. When the actuator 9 is operated and brings the urine collection device in its storage position in gate 20, the blocking part 25, here two cams, which at that storage position abuts the front pending arm 15. This will block the positioning part 10. When the actuator 9 is now operated further, the gate 20 will be lifted into its open position (FIG. 4).

Figure 9:
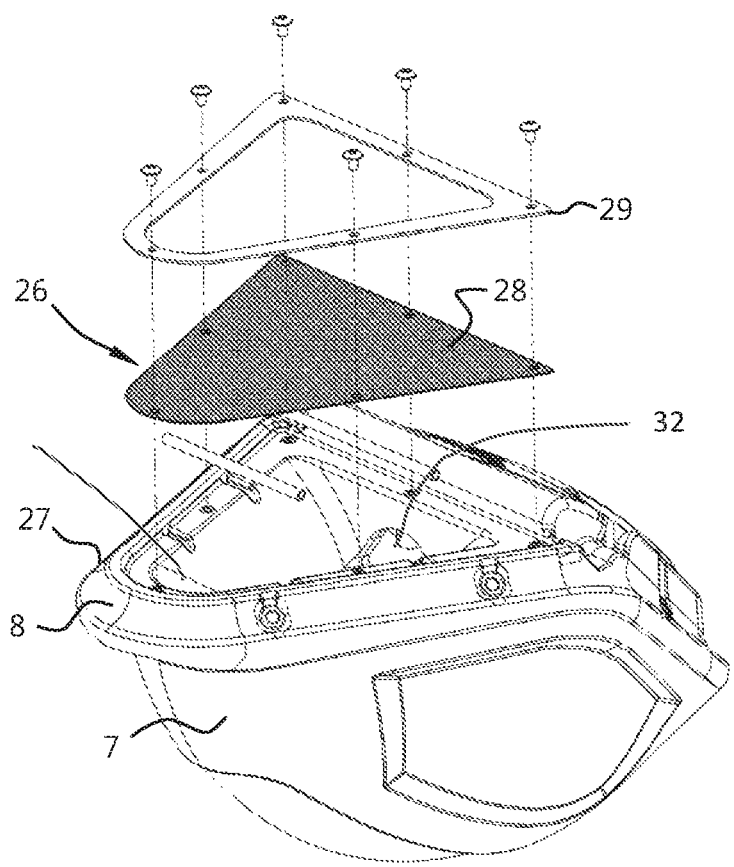
FIG. 9 shows an embodiment of a urine container, in a perspective, exploded view.

In order to have the pendula part 12 have its equilibrium at a first swing position S1 and swing away from an animal to the second swing position S2 when pushed, in the current embodiment the front pendula arm 15 is bent past an attachment location of the rear pendula arm 14. FIG. 9 shows a perspective view of the urine container 7 with reinforcement rim which has a tapered frontal end that forms the stimulator 8. The urine container 7 in longitudinal cross section has a circle section lower bottom, and which is also sideward rounded. It thus is substantially bowl-shaped, with a tapered rim. This additionally allows the centered equilibrium of the lateral motion L. An inlet opening 26 for the urine is here covered with a sieve 28 for preventing accidental entry of faeces and other parts into the urine container 7.

When in the storage position, the urine container 7 is rotated substantially 90 degrees, pointing the stimulator 8 downward.

Figure 10:
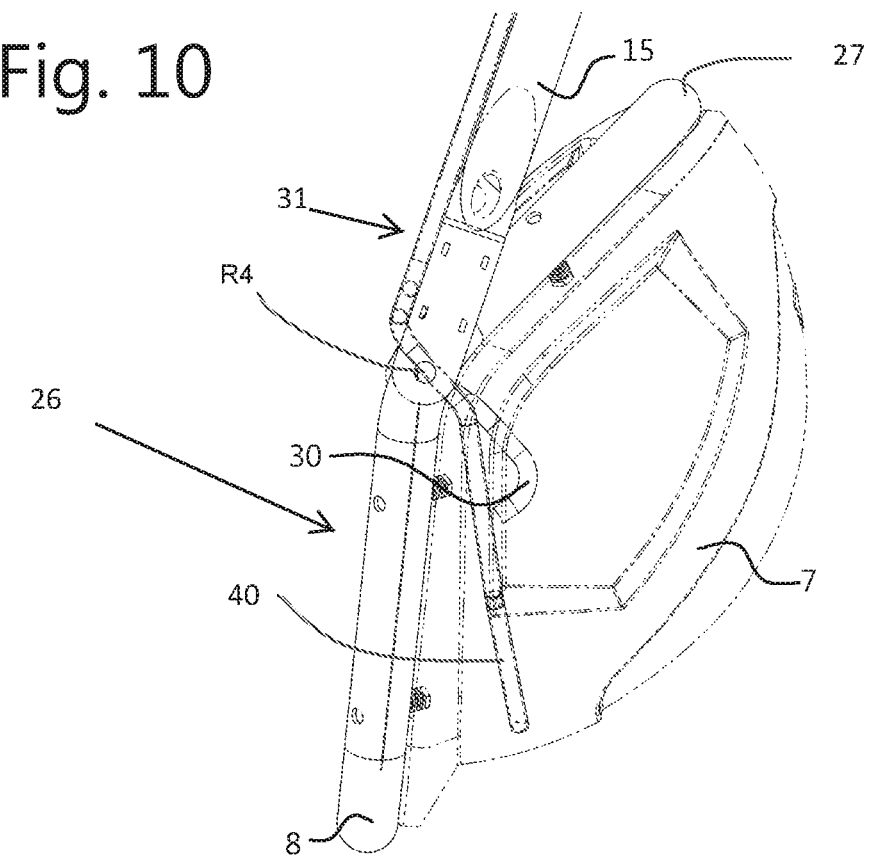
FIG. 10 shows an embodiment of a urine container in cross section, in the orientation in the storage position.

FIG. 10 shows the urine container 7 in cross section. The dotted line shows that the bottom of the urine container is substantially a circle section, with the centre of the circle at the rotation attachment R4 of the front pending arms 15 of the pendula part 11. A urine suction tube 40 is indicated. The urine suction tube 40 is attached to the pendula part 12 to point downward, thus always having its end near the lowest point of the urine container 7 during its motions.

In operation, usually the gate 20 will be open, allowing an animal to enter the retaining space S. Usually, an animal will enter the retaining space S for feed, or perhaps even to be milked.

When an animal enters the retaining space S, the sensor means 5 will detect so and will closed the gate 20. Often, feed will be provided in the feed station 3. In advanced systems, the ID coupled to an animal will provide information regarding the animal, including fee composition and possible additives or medication. The ID can also provide starting information to the urine collection device 2 as to the dimensions of the animal. Via the ID, the urine collection device controller 4 may also retrieve information as to the last urination and for instance the amount. This can be used for determining if the urine collection device 2 should go to its operational position. Separate collection of urine coupled with animal ID allows an analysis of the urine composition linked to an animal, for determining an animals condition and possible needs.

When the sensing means 5 sends information to the controller 4 that the animal is in position in the retaining space, the gate 20 will go into its closed position. Next, the positioning of the urine collection device 2 can continue.

Using the sensing means 5, the controller 4 has information as to a required height of the stimulator 8. The controller 4 will now activate the actuator 9 to bring the stimulator in position. The urine container 7 which is first in the storage position P2 of FIG. 7 will be brought into the working position P1 of FIG. 8. The actuator 9 will operate the height adjustment part 11, bringing the pendula part 12 at the right height H. During the transition from storage position P2 to working position P1, the stimulator 8 together with the urine container will move upward. In this way, a tail of an animal will be gently pushed aside. Thus, startling or irritating an animal is prevented.

The pendula part 12 swings freely, having its equilibrium position S1 such that the stimulator 8 presses at the right location to start the urination. Usually, the animal will now arch its back, indication start of urination. In the current embodiment, some seconds after the controller 4 detects the arching, the urine container 7 will be lowered a little before urine will be collected. To that end, controller 4 will activate the actuator 9 for operating the height adjustment part 11.

In the current embodiment, the sensing means 5 comprise a sensor in the urine container detecting presence of urine. The sensing means 5 will communicate this to the controller. The controller 4 will now operate the urine container emptying device 31. The urine container emptying device 31 comprises a suction tube 40 that extends from the rotation axis R4 to the inner bottom of the urine container 7. Via the suction tube 40 the urine will be directed to a separate collector (not indicated). A predetermined time after the start of urination is detected by the controller 4, the controller 4 will activate the actuator 9 to bring the urine collection device 2 into its storage position. This will induce a rotation of the urine container 7 about its rotational axis R4. During this displacement, due to the round inner bottom of the urine container 7 and the location of the suction tube 40 of the urine container emptying device 31, an end of the suction tube will remain near the bottom of the urine container 7, allowing it to be emptied completely. When the urine container 7 is at its storage position in the gate 20 and the animal is ready feeding (or its feed-time is over or the feed is completely eaten, the gate 20 will be brought in its open position via the actuator 9.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of this invention and are obvious combinations of prior art techniques and the disclosure of this patent.

REFERENCE NUMBERS 1 containment fence
2 urine collection device
3 feed station
4 Controller
5 sensor means
6 positioner
7 urine container
8 stimulator
9 actuator
10 positioning part
11 height adjustment part
12 pendula part
13 lateral pendula part
14 rear pending arm 15 front pending arm
16 angled lever
17 actuator pivot axis
18 angled lever pivot axis
19 pivot axis coupling angled lever and rear pendula arm
20 gate
21 pivot axis
22 gate-fixed pivot coupling
23 connecting bar
24 gate mounting bars
25 pendula part blocking cam
26 urine container inlet
27 urine container rim
28 sieve
29 sieve connecting part
30 urine container cleaning jet
31 urine container emptying device
32 urine container separation wall
33 urine container storage space wall
35 gate blocking part
36 rear pendula coupling bar
37 front pendula arm pivot coupling
40 urine suction tube
ID animal identifier
R gate rotational axis
R1 actuator rotation axis
R4 urine container rotation axis
S confinement or retaining space
A retaining area
P1 working position
P2 storage position
H1 first height position
H2 second height position
Hu urine container height
Hs stimulator height.
H set height
S1 first or front swing position
S2 second or rear swing position
L lateral direction
L1, L2 end lateral positions

The invention claimed is:

1. A urine collection device for a cow, comprising:
a positioner;
a urine container coupled to said positioner;
a sensor for detecting a cow position;
a stimulator for stimulating a stimulation region of a cow, which stimulation region is ventral with respect to a vulva of said cow, and
a controller,
wherein said controller is functionally coupled to said sensor for in operation receiving a cow position of said cow, and said controller is functionally coupled to said positioner and said stimulator, said controller configured for controlling said positioner for bringing said stimulator at said stimulation region and for stimulating said stimulation region of said cow in response to a cow position being within a predefined range, which stimulation starts a urination, and controlling said positioner for positioning said urine container from a storage position to a working position for receiving a subsequent flow of urine from said stimulated cow, wherein said urine container comprises a front end for providing at least part of said stimulator, and
wherein said positioner comprises:
an actuator;
a positioning part connected to said actuator for positioning said urine container between said storage position and said working position;
a height adjustment part connected to said actuator for setting a container set height;
a pendula part coupling said urine container to said positioning part, said pendula part allowing a substantially free swing between a first swing position S1 and a second swing position S2 while maintaining said urine container front end substantially at a same height with respect to said cow, and having its equilibrium at said first swing position.

2. The urine collection device of claim 1, further comprising a retaining device for retaining said cow at a predefined retaining area and within a corresponding retaining space, wherein said positioner and said sensors are positioned for operating at predefined locations with respect to said retaining area when in operation, wherein said working position is within said retaining space, and said sensor has a working range in said retaining area, and wherein said retaining area corresponds to a floor space of a standing cow.

3. The urine collection device of claim 2, wherein said retaining device comprises a fence for retaining an animal within said retaining area, and said positioner has a part connected to said retaining device.

4. The urine collection device of claim 3, wherein said retaining device comprises a gate having an open gate position for allowing access to said retaining area and a closed gate position for blocking said retaining area, and wherein said positioner comprises a part connected to said gate.

5. The urine collection device of claim 4, wherein said urine container has its storage position with respect to said gate, and remains in its storage position when said gate moves between its open gate position and its closed gate position, and is separately operable between its storage position and its working position when said gate is in its closed gate position.

6. The urine collection device of claim 2, wherein an end of said actuator is fixed with respect to said retaining area, and an end of said positioner is fixed to said urine container, and said positioner is configured for positioning said urine container within at least part of said retaining space.

7. The urine collection device of claim 4, wherein an end of said positioner is fixed to said gate, and comprises a height adjustor for adjusting a height of said urine container with respect to said retaining space, and wherein said height adjustor is coupled to an end of said pendula part opposite of said urine container.

8. The urine collection device of claim 1, wherein said pendula part comprises at least one pending arm, and said urine container is coupled via said at least one pending arm to allow a penduling motion.

9. The urine collection device of claim 8, wherein said pendula part comprises at least two pending arms, and urine container is coupled via said at least two pending arms at two urine container locations of the urine container at a distance from one another, and at such positions with respect to a centre of gravity of the urine container that the container has its equilibrium position at a forward swing position, and allowing said urine container to freely swing between its forward swing position to a rear swing position while maintaining the container front end functionally at a same height with respect to the retaining area.

10. The urine collection device of claim 9, wherein said height adjustment part comprises a lever having a pivot axis, one lever arm functionally coupled to said actuator and a second lever arm coupled to said pendula part, wherein said two pending arms are coupled via a pivot coupling to said second lever arm, and wherein each pending arm has a pivot coupling to said second lever arm.

11. The urine collection device of claim 10, wherein one of said pending arms is part of an articulated arm comprising an elbow coupled at a fixed distance to a pivot coupling that has a position that is fixed with respect to said pivot axis of said lever, wherein said pending arm forms an under arm of said articulated arm.

12. The urine collection device of claim 1, wherein said stimulator comprises a bump-shaped extension on the urine container, wherein the bump-shaped extension is on a rim of the urine container.

13. The urine collection device of claim 9, wherein said urine container comprises a bump-shaped extension at one end forming the front end of said urine container, a rear pending arm of said pending arms having one end attached at or near an opposite end of said urine container, and a front pending arm of said pending arms having one end attached between said bump-shaped extension and said attachment of said rear pending arm, wherein said rear pending arm has its one end attached between a center of gravity of said urine container and said attachment of said first pending arm.

14. The urine collection device of claim 1, wherein said actuator comprises a pneumatic cylinder having a series of set extension positions comprising a first extension at which said urine collection device is at its storage position, a second extension at which said urine collection device is at its working position, and an extension range at operating said height adjustment part for moving said urine collection device to its set height.

15. The urine collection device of claim 1, wherein said urine container comprises an internal bottom that is functionally a circle section.

16. The urine collection device of claim 1, wherein said urine container comprises a urine container emptying device, and wherein said urine container emptying device comprises a urine removal tube functionally radially extending from a rotational axis of said urine container to said internal bottom.

17. The urine collection device of claim 1, wherein said sensor is further configured for detecting an end of urination, and said controller is functionally coupled to said sensor for receiving a signal when said urination has ended, and said controller further controls said positioner for returning said urine container to its storage position.

18. The urine collection device of claim 1, wherein said urine container comprises a cleaning device inside said urine container and directed to an opening of said urine container, or wherein said urine container comprises an internal wall defining a urine storage space in said urine container.

19. A non-transient computer-readable medium in combination with the urine collection device of claim 1, the non-transient computer-readable medium comprising a set of instructions that, when executed by a processor of the controller of the urine collection device claim 1:
  retrieves a position of an animal with respect to said urine collection device from said sensor;
  in response to said animal position, positions a urine container at a location with respect to said animal for receiving a flow of urine;
  positions a stimulator in response to said measured position at a stimulation location of said animal, and applies a stimulus for starting a flow of urine.

20. The non-transient computer-readable storage medium of claim 19, wherein during said flow or urine, a parameter relating to said urination is retrieved from said sensor, and in response to a predetermined property of said measured parameter relating to said urination indicating an end of said flow of urine, positions said urine collection device at said storage position.

* * * * *